(12) United States Patent
Herman et al.

(10) Patent No.: US 9,120,568 B2
(45) Date of Patent: Sep. 1, 2015

(54) AUTONOMOUS RESUPPLY SYSTEM AND METHOD

(75) Inventors: Carl Herman, Owego, NY (US);
Dennis Rude, Apalachin, NY (US);
Thomas Spura, Endicott, NY (US);
Shirley D. Kupst, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 233 days.

(21) Appl. No.: 13/493,551

(22) Filed: Jun. 11, 2012

(65) Prior Publication Data
US 2013/0332008 A1 Dec. 12, 2013

(51) Int. Cl.
*B64C 39/02* (2006.01)
*G05D 1/02* (2006.01)
*G05D 1/06* (2006.01)
*G06Q 10/08* (2012.01)
*B64F 1/00* (2006.01)
(Continued)

(52) U.S. Cl.
CPC ............. *B64C 39/024* (2013.01); *B64F 1/007* (2013.01); *B64F 1/125* (2013.01); *B64F 1/32* (2013.01); *G05D 1/0225* (2013.01); *G05D 1/0234* (2013.01); *G05D 1/0676* (2013.01); *G06Q 10/08* (2013.01); *B64C 2201/024* (2013.01); *B64C 2201/128* (2013.01); *B64C 2201/146* (2013.01); *G05D 2201/0216* (2013.01)

(58) Field of Classification Search
CPC ... G01C 21/28; G05D 1/0234; G05D 1/0225; G05D 1/0676; G05D 2201/00; G05D 2201/0216; B65G 67/00; B64C 39/02; B64C 39/024; B64C 2201/024; B64C 2201/128; B64C 2201/146; B64F 1/007; B64F 1/125; B64F 1/32

USPC ................................................ 701/2; 414/495
See application file for complete search history.

(56) References Cited

U.S. PATENT DOCUMENTS 1,581,674 A * 4/1926 Brown ...................... 294/82.33
1,640,667 A * 8/1927 Osborn ........................ 258/1.2
(Continued)

FOREIGN PATENT DOCUMENTS

GB  2233527  1/1991

OTHER PUBLICATIONS

Ackerman, Evan, Matternet Wants to Deliver Meds with a Network of Quadrotors, Aug. 30, 2011, IEEE Spectrum via CNET, pp. 15-16. http://spectrum.ieee.org/automaton/robotics/medical-robots/mini-uavs-could-be-the-cheapest-way-to-deliver-medicine.*

(Continued)

*Primary Examiner* — John Q Nguyen
*Assistant Examiner* — Nadeem Odeh
(74) *Attorney, Agent, or Firm* — Wolf, Greenfield & Sacks, P.C.

(57) ABSTRACT

Some embodiments relate to a system and method of automatically transporting cargo from a loading station to an unloading station using a vehicle. Loading and unloading of cargo may be accomplished automatically without the need for human operators of either the loading station, the unloading station, or the vehicle. The unloading and loading station each comprise guide rails and a plurality of directional signal sources used by the vehicle to control its current position so that it may retrieve and deliver a target load. The vehicle comprises at least one sensor for detecting modulated directional signals and a controller to control the current position of the vehicle based on the received signals.

19 Claims, 5 Drawing Sheets

(56) References Cited

U.S. PATENT DOCUMENTS

| | | | |
|---|---|---|---|
| 3,671,963 | A | 6/1972 | Assouline et al. |
| 5,929,777 | A | 7/1999 | Reynolds |
| 5,986,581 | A | 11/1999 | Magdaleno, II et al. |
| 7,543,780 | B1 | 6/2009 | Marshall et al. |
| 7,954,766 | B2 | 6/2011 | Brainard et al. |
| 2003/0028323 | A1* | 2/2003 | Zeitler et al. ............... 701/219 |
| 2004/0135031 | A1 | 7/2004 | Stupakis |
| 2012/0078743 | A1* | 3/2012 | Betancourt ............... 705/26.3 |
| 2014/0032034 | A1* | 1/2014 | Raptopoulos et al. .......... 701/25 |

OTHER PUBLICATIONS

Needleman, Rafe, Matternet delivers drugs by robocopter, Aug. 28, 2011, CNET Website Article. http://www.cnet.com/news/matternet-delivers-drugs-by-robocopter/.*

Ross, Valerie, In Development: Networks of Unmanned Quadcopters to Ferry Medicine to Isolated Areas, Aug. 30, 2011, Discover Magazine Blog. http://blogs.discovermagazine.com/80beats/2011/08/30/in-development-networks-of-unmanned-quadcopters-to-ferry-medicine-to-isolated-areas/#.UzmMVsX7Lco.*

Lockheed Martin, "Unmanned K-Max Achieves Numerous 'Firsts' During Recent Demonstration Flights," press release, Yuma, Arizona, Feb. 23, 2011, downloaded Nov. 29, 2011, http//www.lockheedmartin.com/us/news/press-releases/2011/february/UnmannedK-MAXAchievesNume.html.

Lockheed Martin and Kaman Aerospace Corporation, "K-Max® Unmanned Aircraft System Optionally Piloted Cargo Lift Helicopter for the Warfighter," brochure, Nov. 20, 2010, downloaded Nov. 29, 2011, http://www.lockheedmartin.com/content/dam/lockheed/data/ms2/documents/K-MAX-brochure.pdf.

International Search Report and Written Opinion for International Application No. PCT/US2013/045154 mailed Nov. 27, 2013.

* cited by examiner

FIG. 5

AUTONOMOUS RESUPPLY SYSTEM AND METHOD

BACKGROUND OF INVENTION

The techniques described herein relate to providing supplies and/or equipment to a destination location while minimizing the number of humans playing an active role in the acts of loading, delivery, and unloading.

Transporting supplies, provisions, equipment or any cargo is crucial in a wide variety of situations. For example, military resupply refers to the entire journey taken to bring supplies to troops in the field. There may arise situations where it is dangerous for human operators to be either in the transportation vehicle or at the loading and unloading stations, collectively referred to as base stations. For example, military resupply may be vulnerable to improvised explosive devices (IEDs) or other various attacks on the vehicle or the base stations. In situations where the vehicle is a helicopter, the job of loading and unloading cargo from a load line attached to the helicopter is inherently dangerous because it may require a team of humans to work underneath a hovering helicopter while a load line, potentially carrying heavy cargo, swings freely.

The same dangers exist while, for example, transporting supplies in the case of natural disaster relief or industrial applications such as transporting felled trees in the logging industry. In the case of transporting felled trees using helicopter in the logging industry, injuries to the ground crew doing the loading and/or unloading are frequent and undesirable.

BRIEF SUMMARY OF THE INVENTION

Some embodiments of the present invention relate to techniques for accomplishing resupply while reducing or completely eliminating the need for human operators onboard the transportation vehicle or at the base stations.

Some embodiments relate to a vehicle for transporting at least one load. The vehicle may use at least one sensor to receive a modulated directional signal from a loading station, wherein the modulated directional signal comprises load information about the at least one load. The load information may be information describing the contents of the at least one load, for example, a quantity, a weight, a size, a batch number, dimensions, a geometry, a content description, a destination location or an identification number. The vehicle may further comprise at least one controller configured to receive at least one output from the at least one sensor, wherein the at least one output comprises the load information; determine a direction from which the modulated directional signal was received based on the at least one output; control a current position of the vehicle based on the determined direction; and determine a destination for the load based on the load information.

In some embodiments, the vehicle may be a helicopter. A load bearing device, such as a load line, may be attached to helicopter, the load bearing device configured to carry the at least one load. The vehicle may be unmanned and/or autonomous.

In some embodiments, the vehicle may additionally receive at least one modulated directional signal from an unloading station. The controller may use the output from the at least one sensor to control the current position of the vehicle while delivering the at least one load to the unloading station.

Some embodiments relate to a base station, which may be a dual-purpose loading and unloading station. A loading station may automatically provide at least one load to a vehicle, whereas an unloading station may automatically receive at least one load from a vehicle The base station may comprise at least one guide rail for guiding a load bearing device, such as a load line, which is attached to the vehicle, to a cargo zone where the load may be provided to the vehicle or received from the vehicle. The base station may also comprise a plurality of beacons, which are directional signal sources, each of the plurality of beacons configured to send at least one directional signal to the vehicle, wherein the at least one directional signal may be modulated to encode information. The encoded information may be load information associated with the load being transported or it may be unloading information pertaining to the type of load an unloading station may receive.

The loading station may also comprise an automatic feed for automatically directing the at least one load towards or away from the cargo zone. In some embodiments, a scanner is configured to scan an identifier of the at least one load to obtain an identification number, which may be used to obtain the load information. The load information may be sent to each of the plurality of beacons for encoding into the directional signal. In some embodiments, the identifier of the at least one load may be a radio frequency identification (RFID) tag.

Some embodiments are directed to a method of automatically transporting a load using a vehicle, the method comprising providing a first plurality of beacons at a loading station; sending, from the loading station, a first modulated directional signal to the vehicle from each of the first plurality of beacons, wherein the first modulated directional signal comprises information pertaining to at least one load; receiving, at the vehicle, the first modulated directional signal; controlling a current position of the vehicle based on the first modulated directional signal received from each of the first plurality of beacons, wherein the current position is controlled such that the vehicle acquires the load from the loading station; determining a destination location for the load based on the load information; transporting, by the vehicle, the load from the loading station to an unloading station located at the destination location; providing a second plurality of beacons at an unloading station; sending, from the unloading station, a second modulated directional signal to the vehicle from each of the second plurality of beacons, wherein the second modulated directional signal comprises information pertaining to the unloading station; and controlling the current position of the vehicle based on the second modulated directional signal received from each of the second plurality of beacons, wherein the current position is controlled such that the vehicle releases the load at the unloading station. In some embodiments, an identifier of the at least one load is scanned to obtain an identification number. The identification number may be used to determine the load information. In some embodiments, the destination location of the at least one load may be determined by communicating the identification number to a management system.

DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

The inventors have recognized and appreciated that the transport and resupply of cargo may be made safer using unmanned and/or autonomous vehicles. Moreover, utilizing automatic conveyor systems, guide rails, directional beacons, and a transport vehicle that can detect and respond to the directional beacons, the number of people required to work on the ground at a loading or unloading station may be reduced. In addition to providing a safer environment, the number of man-hours to staff a resupply chain may be reduced, thereby reducing costs of operating the resupply chain.

In military resupply, there may be a loading station, an unloading station, and a transport vehicle. In some embodiments, the resupply system may also comprise a management system for controlling the logistical aspects of the resupply system. Loading stations and unloading stations may be referred to, collectively, as base stations. Some embodiments of the present invention are directed to automating each aspect of the resupply chain. Embodiments of the present invention, however, are not limited to military resupply. For example, the systems and methods described herein may be used in any industrial context requiring the transport of cargo, such as the logging industry, or in the context of a natural disaster where equipment and supplies must be delivered to an uncertain environment where few human personnel are available to staff the base stations.

In some embodiments, the vehicle used for transport is equipped with sensors to receive directional beacon signals from loading and unloading stations. The directional beacon signals may be modulated to encoded information to be used by the vehicle to control the current position of the vehicle and a final destination of the vehicle. The directional beacons may be associated with one or more guide rails of the base stations. The beacons guide the vehicle to a cargo zone, which may be a loading zone or an unloading zone, where a load carried by the vehicle will be loaded or unloaded, respectively. The information encoded in the modulated beacon signal may convey information about the load to the vehicle, such as the type of load, the weight, or any other information.

After the load is acquired by the vehicle, the vehicle transports the load to its destination, which may include an unloading station. The unloading station may comprise at least one guide rail with a plurality of associated beacons. The beacons emit a directional signal that may be modulated to carry encoded information to the vehicle. For example, the unloading station may send the vehicle information about what type of load is to be received by a particular chute. An unloading station may comprise a plurality of chutes or automatic feeds, each designated to receive a particular type of cargo. Based on the received beacon signals from the unloading station, the vehicle will control its current position so that it may deliver the load it is carrying to an unloading zone of the unloading station.

Figure 1:
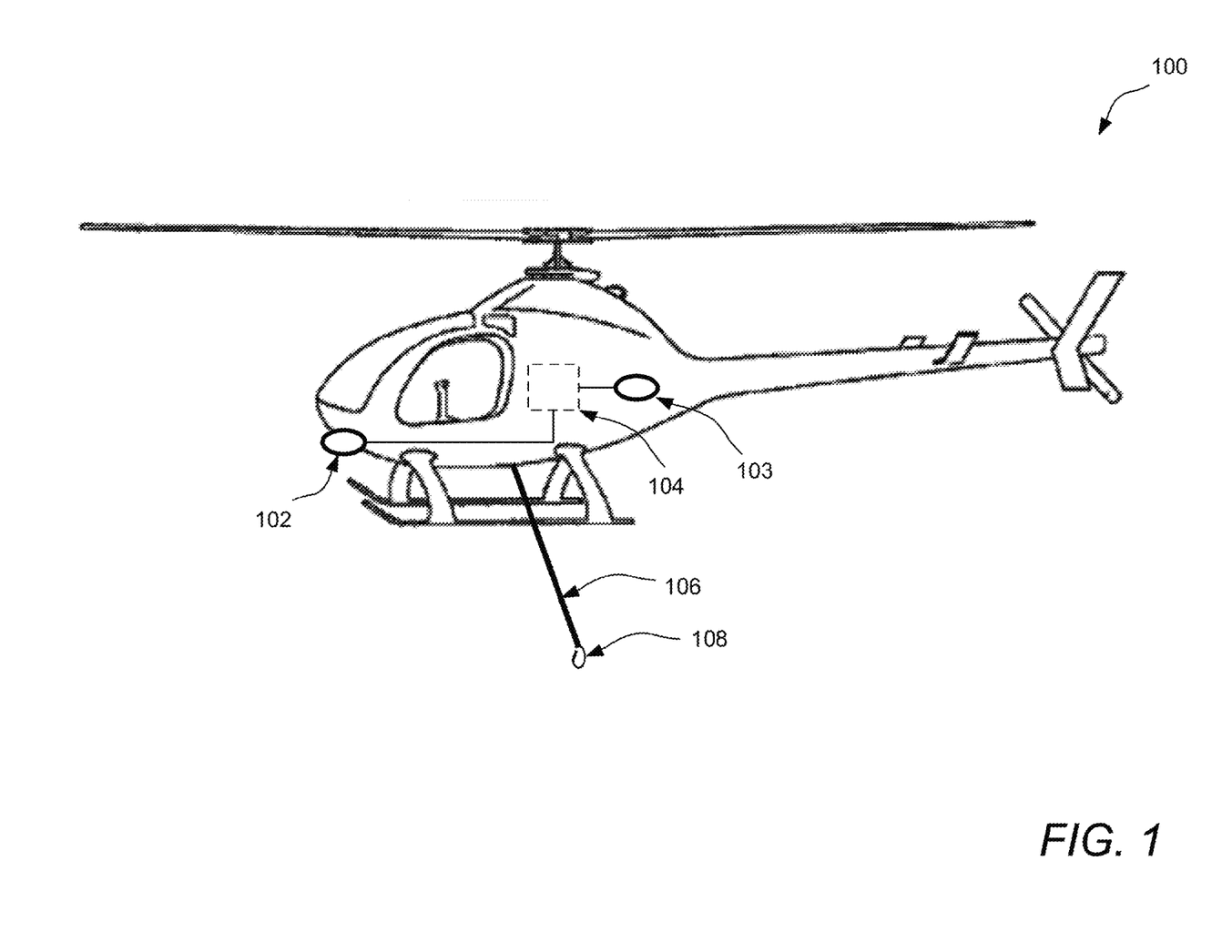
FIG. 1 illustrates a simplified view of an exemplary vehicle for performing autonomous resupply.

FIG. 1 illustrates a simplified view of the transport vehicle 100 that may be used in resupply chain. In the illustrated embodiment, vehicle 100 is a helicopter. The vehicle 100 may be any type of helicopter, including, but not limited to, a Kaman K-MAX helicopter. Vehicle 100 may alternatively be an airborne balloon, blimp, zeppelin, airplane, or any other type of aerial vehicle. In some embodiments, the vehicle 100 may be a space-based vehicle, such as a satellite or space shuttle. In further embodiments, the vehicle 100 may be a land vehicle such as an automobile, truck or train. Embodiments of the invention are not limited to any particular type of vehicle 100.

In some embodiments, vehicle 100 may be an unmanned vehicle. An unmanned vehicle is any vehicle that does not carry the human operator and/or passenger. For example, an unmanned vehicle may be controlled via remote control by a human operator at some other location. In some embodiments, the unmanned vehicle may be autonomous such that the vehicle 100 does not need to be controlled by a human operator. Instead, an autonomous vehicle may use a variety of sensors to attain information about the environment and use a controller 104 to control the current position of vehicle 100 autonomously.

If vehicle 100 is autonomous, it is not necessarily unmanned. In some embodiments, the human operator or passenger may be aboard vehicle 100 while controller 104 controls the actual operation of vehicle 100. The vehicle may be partially autonomous such that a human operator, such as a pilot of a helicopter, controls certain aspects of the helicopter's flight but not others, or such that the human operator only controls the helicopter at certain times. In some embodiments, the human operator may never pilot vehicle 100, but instead perform duties other than controlling vehicle 100.

The vehicle 100 of FIG. 1 comprises at least one sensor 102 to receive a modulated beacon signal from the base stations. Embodiments of the invention are not limited to any particular type of sensor or any particular placement of the sensor on the vehicle. For example, vehicle 100 is illustrated to have sensor 102 mounted to the front, as well as sensor 103 mounted to the side. There may also be an additional sensor on the side of the vehicle 100 not shown in FIG. 1. One or more sensors may also be mounted on the tail, the top, the bottom or any other point on vehicle 100.

Sensors 102-103 may be configured to receive any type of signal from the base station. For example, sensor 102 may receive a directional signal from a loading station. The directional signal is a signal that radiates from the signal emitter in such a way that the location of the signal emitter and/or direction from which the signal was emitted may be determined by the vehicle receiving the signal. In some embodiments, sensors 102-103 are configured to receive an infrared (IF) signal from the base stations. However, any suitable directional signaling radiation may be used. For example, sensors 102-103 may be configured to receive visible radiation or ultraviolet radiation.

Vehicle 100 may also comprise controller 104, which may receive a variety of information from a plurality of sensors. For example, sensors 102-103 may provide information pertaining to the signals received from the base stations. Controller 104 may also use information received from a variety of other sensors, such as a GPS unit, an altimeter, video cameras, electromagnetic sensors, chemical sensors, biological sensors, and/or radar sensors. The type of information used by controller 104 is not limited in any way. Also, controller 104 may be implemented in any suitable way. For example, the controller 104 may comprise hardware, software, firmware, or any combination thereof. Controller 104 is illustrated in FIG. 1 with a dashed line to indicate that it is located somewhere within vehicle 100 and not on the exterior. The location of controller 104 is not limited to any particular location and may be placed at any suitable point within or without vehicle 100.

Vehicle 100, which is illustrated in FIG. 1 as a helicopter, comprises a load line 106. The load line 106 may be attached to vehicle 100 in any suitable way and is used to carry a load during resupply. Load line 106 may include any suitable hitch device 108. For example, the hitch device 108 may be a hook. In some embodiments, the hitch device 108 may be configured to automatically connect to the load being transported without assistance from a human being. Embodiments are not limited to using a load line 106, as illustrated in FIG. 1. Any suitable load bearing device may be use. For example, a land- or water-based vehicle may use a grappling device or a hook to carry a load. Alternatively, a load bearing trailer may be attached to vehicle 100 and act as a load bearing device. Embodiments are not limited to any particular load bearing device.

Figure 2:
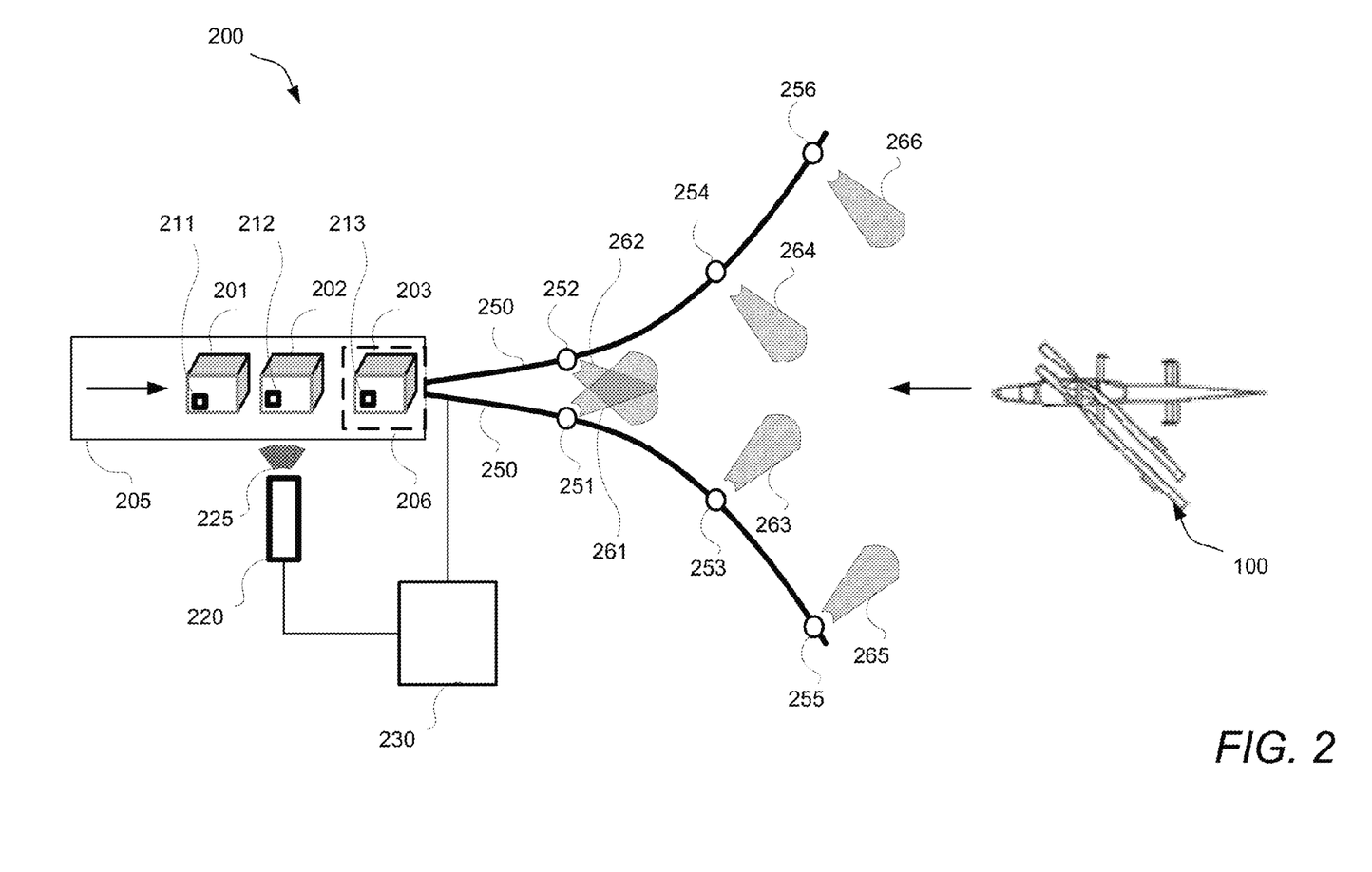
FIG. 2 illustrates a simplified view of an exemplary loading station.

FIG. 2 illustrates a simplified view of an exemplary loading station 200. In some embodiments, the purpose of loading station 200 is to provide one or more loads 201-203 to vehicle 100. The loads 201-203 may be provided to a loading zone 206 by an automatic feed 205. Loading zone 206 may be a portion of automatic feed 205 or may be a physically separate platform. Any suitable automatic feed may be used. For example, automatic feed 205 may be a conveyor belt or a chute that brings loads 201-203 to loading zone 206.

In some embodiments, loads 201-203 may each be provided with an identifier 211-213, respectively. Any suitable identifier may be used, as embodiments of the invention is not limited in this respect. For example, identifiers 211-213 may be barcodes, quick response (QR) codes, radiofrequency identifier (RFID) tags, or any other forms of identification. Loading station 200 may be provided with a scanning device 220 capable of automatically reading identifiers 211-213 of loads 201-203 as the loads pass scanner 220 on the automatic feed 205. If, for example, identifier 213 is a barcode, scanner 220 may read identifier 213 using laser emission 225. In embodiments where identifier 213 is an RFID tag, the RFID tag may be passive or active. For example, if the RFID tag is passive, then scanner 220 may emit radio frequency radiation 225 to read the identification information of the RFID tag. Implementation of scanner 220 is not limited in any way. For example, the scanner may be mounted to automatic feed 205 or loads 201-203 may be scanned at some point prior to automatic feed 205. In other embodiments, scanner 220 may be operated by a human that manually scans identifiers 211-213.

Once identifier 213 is read by scanner 220, the read identification information is sent to controller 230. Controller 230 may be implemented in any suitable way. For example, controller 230 may comprise hardware and software. Controller 230 may be a computer with a network connection that allows access to other computers, servers and/or databases. In some embodiments, controller 230 may obtain information about load 203 by looking up the identification information in a database. The database may be stored locally in controller 230 or it may be located in a separate physical location accessible via the network connection.

The type of load information that may be acquired by controller 230 is not limited in any way. For example, the load information may comprise the type of cargo in load 203, a weight of load 203, a quantity of items in load 203, a batch number for the items in load 203, a set of dimensions of load 203, a description of the geometry of load 203, a description of the contents of load 203, or any other information that may be useful to vehicle 100 while acquiring load 203. The set of dimensions may include the height, width and depth of the load 203. The description of the geometry may be any suitable description of the shape of load 203. The description of the contents may, for example, indicate that the load 203 contains ammunition, food, fuel, or some other type of content. Controller 230 may send some or all of the load information to beacons 251-256 for transmittal to vehicle 100. This may be done in any suitable way. For example, the controller may be coupled to beacons 251-256 via a network connection, or any other suitable electrical connection. Alternatively, controller 230 may communicate wirelessly with beacons 251-256. Embodiments of the invention are not limited to any particular connection mechanism. Beacons 251-256 may be coupled to controller 230 by a direct connection or via one or more intermediary devices such as network switches or routers.

Beacons 251-256 may each be a directional signal source that emits signals 261-266 in such a way that vehicle 100 may determine, upon receiving said directional signal, from which direction the signal was received. The signals 261-266 generated by the directional beacons 251-256 are used by vehicle 100 to control its current position so that it may retrieve load 203 from the loading zone 206. Any suitable directional signal source may be used. For example, beacons 251-256 may emit signals 261-266 comprising infrared (IF) radiation, visible light radiation, or ultraviolet radiation. Directional signal sources are desirable because they may allow for line-of-sight communication with vehicle 100 without allowing interception of the signal by a potential enemy. Further, the possibility of interception may be reduced by providing shielding at loading station 200 that block signals 261-266 from reaching beyond a point determined to be insecure. In some embodiments, the signal source may a laser, a light emitting diode (LED), or any other suitable source of a signal. Also, any suitable number of beacons may be used. For example, FIG. 2 illustrates an embodiment with six beacons. However, embodiments of the invention are not limited.

Beacons 251-256 may be placed at any suitable position and in any suitable arrangement. For example, beacons 251-256 may be attached to, or a part of, guide rails 250. Loading station 200 comprises at least one guide rail 250, but preferably at least two guide rails 250. Guide rails 250 may be used to guide load line 106 of vehicle 100 to the loading zone 206 so that hitch device 108 may attach to load 203. As vehicle 100 approaches the loading station, adjusting its position in response to the received signals 261-266, the load line is physically guided to the proper location for attaching to load 203 in loading zone 206. The guide rails 250 may be formed of any suitable material and be any suitable shape. For example, FIG. 2 illustrates guide rails 250 having a hyperbolic shape. Other embodiments may use straight guide rails, convex guardrails, or concave guardrails. Guide rails 250 may comprise a metal, plastic, a composite material, or any other suitable material.

As mentioned previously, beacons 251-256 may each be a directional signal source that emits signals 261-266. Signals 261-266 may be modulated such that information is encoded in the signals. This encoding and modulation may be done in any suitable way. For example, if signals 261-266 comprise infrared radiation, information may be encoded using frequency modulation, amplitude modulation, or quadrature amplitude modulation. Furthermore, the information may be encrypted using any suitable encryption technique.

Beacons 251-256 may encode different types of information at different times during the resupply. For example, as vehicle 100 initially approaches loading station 200 modulated directional signals 261-266 may transmit load information such as the type of cargo awaiting pickup at loading zone 206, a load identification number, load batch number, or any other information pertaining to load 203. After vehicle 100 has successfully guided itself using signals 261-266 from beacons 251-256 to the location where load 203 becomes attached to load line 106, beacons 251-256 may transmit other information via the modulated signals 261-266. For example, modulated directional signals 261-266 may transmit information informing vehicle 100 that load 203 was successfully attached to load line 108. Information may also be transmitted about the final destination of load 203. For example, coordinates of the destination unloading station may be included in signals 261-266. In some embodiments, the destination coordinates may be transmitted only after load 203 is retrieved by vehicle 100 and vehicle 100 begins moving away from loading station 200. In other embodiments, the location of the destination unloading station is not sent to vehicle 100 from loading station 200, but is acquired by vehicle 100 from some other resource based on the load information sent to vehicle 100 from loading station 200. For example, vehicle 100 may be able to communicate via satellite to a remote management system that, based on the identifier 213 associated with load 203, determines the destination coordinates for load 203 and transmits them to vehicle 100.

After vehicle 100 successfully obtains load 203, vehicle 100 may depart loading station 200 and begin transport of load 203 to its appropriate destination. In some embodiments, the destination coordinates are transmitted from loading station 200 to vehicle 100.

In other embodiments, the destination coordinates may be obtained from the management system. FIG. 2 illustrates an embodiment using a single loading station 200. Embodiments of the invention are not so limited. In some embodiments, any suitable number of loading stations may be provided at a single location. For example, three loading stations 200, each delivering a separate type of cargo on its associated automatic feed 205, may be used. In such an embodiment, each loading station 200 has associated beacons and each set of beacons may transmit a signal identifying the particular cargo awaiting retrieval in its associated loading zone. In some embodiments, only the loading station 200 holding load 203, which vehicle 100 is assigned to retrieve, will transmit modulated directional signals using its associated beacons. In other embodiments, all loading stations with loads awaiting retrieval in its associated loading zone will transmit information pertaining to its associated load using its associated beacons. In such an embodiment, vehicle 100 is configured with information pertaining to the load it is assigned to retrieve. Accordingly, vehicle 100 may determine, using controller 104, from which loading station 200 to retrieve the load.

In some embodiments, a plurality of loads may be acquired by vehicle 100. The plurality of loads may be acquired from a single loading station or a plurality of loading stations. Embodiments of the invention are not limited to a particular number of loads.

Figure 3:
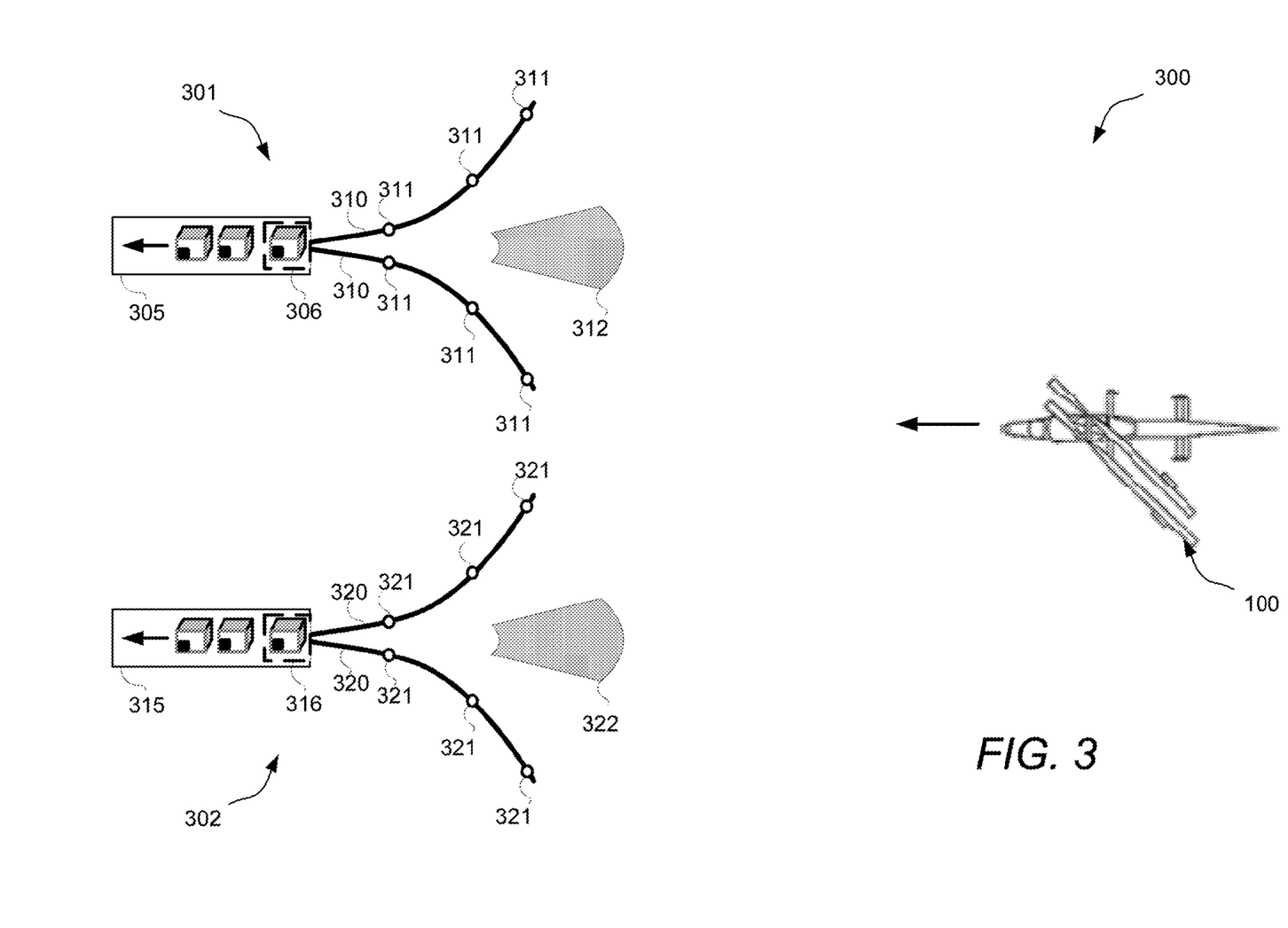
FIG. 3 illustrates a simplified view of an exemplary unloading area.

FIG. 3 illustrates a simplified view of an exemplary unloading area 300 with two separate unloading stations 301-302. Embodiments of the invention are not limited to any particular number of unloading stations. For example, there could be a single unloading station or more than two unloading stations. Many aspects of unloading stations 301 and 302 are similar to loading station 200. For example, there may be beacons 311 and 321, guide rails 310 and 320, and an automatic feeds 305 and 315 that operate in very similar ways as loading station 200. The main difference between loading station 200 and unloading station 301 is that vehicle 100 travels to loading station 301 to drop off a load it is already carrying. In some embodiments, the load carried by vehicle 100 was acquired at a loading station as described in connection with FIG. 2.

Because unloading stations 301-302 are configured to receive loads from vehicle 100, automatic feeds 305 and 315 direct loads away from unloading zones 306 and 316. For clarity, certain aspects of unloading stations 301-302 are not illustrated in FIG. 3, such as scanners for scanning the identifiers associated with each load as it is unloaded at each loading station and the controller for sending information to the beacons. Also, the signals sent from beacons 311 and 321 are illustrated as single signals 312 and 322, even though each unloading station may emit a plurality of beacon signals.

In some embodiments, the unloading area may not be aware of the type of cargo vehicle 100 is transporting. For vehicle 100 to determine which unloading station it should bring its load to, it receives signals 312 and 322 from each unloading station. Similar to the signals associated with the loading station, the directional signals act as beacon signals to help guide the vehicle 100, but they also provide information by modulating the signal in any suitable way. In some embodiments, signals 312 and 322 are modulated to indicate unloading information to vehicle 100. The unloading information may be, for example, the type of cargo that should be deposited at each associated unloading station. For example, unloading station 301 may only accept fuel, whereas unloading station 302 may only accept ammunition. The type of cargo is not limited in any way. For example, the type of cargo may be rations, equipment, weapons, or medicine. Moreover, each unloading station is not limited to accepting only a single type of cargo. For example, unloading station 301 may receive both medicine and rations, or any other combination of cargo types. In some embodiments, there may only be a single unloading station that receives all types of cargo and the cargo is sorted after it is received. In other embodiments, the signals 311 and 322 may carry unloading information pertaining to the weight limit associated with the associated unloading station. For example, unloading station 301 may be able to handle loads that are very heavy, whereas unloading station 302 may not be able to handle extremely heavy loads. Thus, signals 311 and 322 may communicate acceptable maximum weight limits to vehicle 100. Embodiments are not limited to sending limits on weight, as any load characteristic may be used to limit the loads incoming to a particular unloading station. For example, dimensional or shape restrictions, such as length, width or height restrictions may be sent to vehicle 100 from the unloading stations. In some embodiments, the unloading information may comprise a status of the unloading station. For example, the status may indicate whether the unloading station is full or empty; operational or non-operational; ready to accept a load or not; or any other suitable status information. In other embodiments, batch number or identification number restrictions may be unloading information. Embodiments of the invention are not limited to any particular type of unloading information being transmitted to vehicle 100.

In some embodiments, unloading station 301 may communicate different types of information at different times in the resupply process. For example, when vehicle 100 is in position to release the load into unloading zone 306, beacons 311 may transmit information communicating that the load is in place and may be released by vehicle 100.

Similar to the loading station 200, unloading station 301 guides vehicle 100 to the unloading zone 306 using directional signals 312 emitted from beacons 311. Vehicle 100 adjusts its current position based on its determination of where the unloading zone 306 is. Once vehicle 100 gets the load it is carrying in place, it may be released using an automatic hitch release mechanism. The load, after release, may have its associated identifier scanned by a scanner so that the unloading station can ascertain information about the load that was received.

In some embodiments, multiple loads may be released by vehicle 100. The plurality of loads may be released at a single unloading station or a plurality of loading stations. If the loads are released at a single unloading station, the loads may be released at the same time or serially. Embodiments of the invention are not limited to any number of loads.

Figure 4:
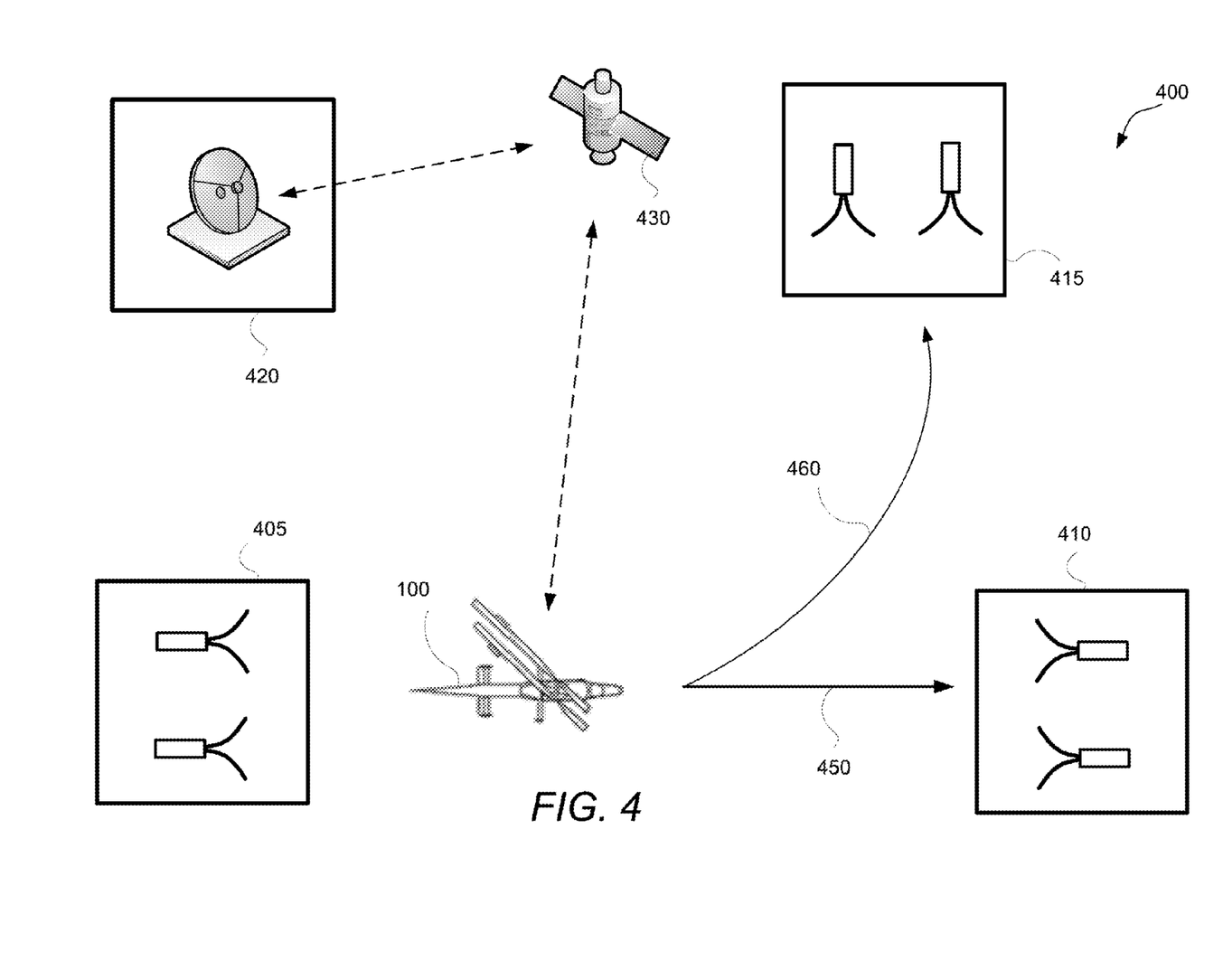
FIG. 4 illustrates a simplified view of the overall resupply system.

FIG. 4 illustrates a simplified view of the overall resupply system 400. Vehicle 100 retrieves at least one load from loading station 405. Vehicle 100 then determines its destination by either receiving destination coordinates from loading station 405 or using the load information received from loading station 405 to request a destination for the load from management system 420. Management system 420 may communicate to vehicle 100 using any suitable means. For example, signals sent to and from satellite 430 may be used to facilitate communication with vehicle 100. Satellite communication has the advantage that the signals sent from vehicle 100 may not as easily detectable by a potential enemy as RF signals may be due to the directional nature of satellite communication.

Management system 420 may be implemented in any suitable way and may be located at any location. For example, it may be located in the same country or region as the base stations 405, 410 and 415. In some embodiments, management system 420 may be located in a different country or on a vehicle, such as an aircraft carrier, ship, airplane, or land vehicle. Management system 420 may handle all logistics of the resupply system and may also manage the logistics of a plurality of other unrelated resupply systems.

Vehicle 100 may initially determine that the load it retrieved from loading station 405 is to be delivered to unloading station 410. In some embodiments, while traveling the path 450 to unloading station 410, vehicle 100 may receive a command from management system 420 to redirect the load it is carrying to unloading station 415. If vehicle 100 receives said re-direct command it may change course in the middle of flight such that it travels path 460 to unloading station 415.

Embodiments of the resupply system 400 are not limited to any particular arrangement. For example, unloading and loading stations may be located at the same location such that a base station may act as both a loading area and an unloading area. Any number of loading and unloading stations may be located at any particular location. The distance between the base stations are not limited in anyway. In some embodiments, the base stations may be located such that a one-way trip may be made by vehicle 100 using a single tank of fuel. In other embodiments, the distance between base stations may be short enough such that a round-trip may be made by vehicle 100 using a single tank of fuel. Base stations may be located at any suitable location. For example, base stations may be located on land or at sea. In some space based applications, a base station be part of a space-based vehicle or space station.

Figure 5:
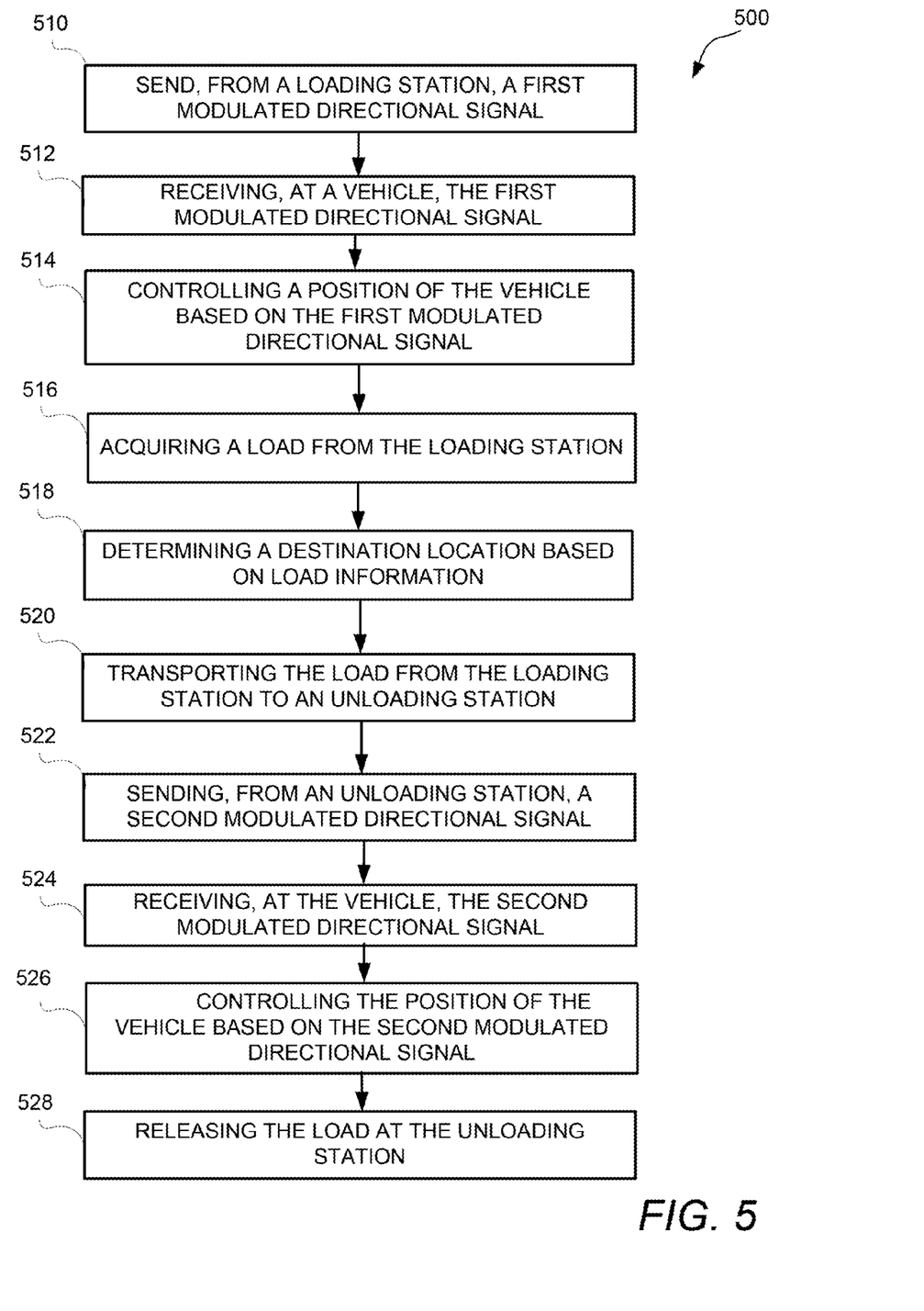
FIG. 5 illustrates an exemplary flowchart for a method of autonomous resupply.

FIG. 5 illustrates a flowchart of an exemplary resupply method 500. Embodiments of the invention are not limited to include each and every act detailed in method 500. Moreover, embodiments of the invention may comprise additional acts that are not illustrated in FIG. 5.

At act 510, a loading station sends a first modulated directional signal. This may be done in any suitable way. For example, as discussed above, a modulated directional signal may be sent from the beacons of loading station 200. The signal may comprise infrared radiation, or any other suitable type of radiation. In some embodiments, the signal may be emitted from a laser or an LED. The directional nature of the signal allows vehicle 100 to use the signal to adjust its current position so that it may accurately acquire the load awaiting transport at the loading station.

The signal may be modulated in any suitable way to transmit information pertaining to the load being retrieved at the loading station. Any suitable load information may be sent. For example, load information may comprise information about the type of cargo, weight of the load, batch number of the cargo, load dimensions, load geometry, a content description and/or destination coordinates for the load.

At act 512, vehicle 100 receives the first modulated directional signal. This may be done in any suitable way. In some embodiments, vehicle 100 may be equipped with at least one sensor capable of detecting the signal emitted by the loading station. For example, vehicle 100 may use one or more infrared detectors capable of detecting infrared radiation emitted by the beacons.

In response to the received first modulated directional signal, vehicle 100 may control a current position of the vehicle at act 514. The current position of a vehicle may refer to the three dimensional point in space of vehicle 100. The current position may be controlled in any suitable way. For example, vehicle 100 may be equipped with a controller configured to use the directional information received from the loading stations beacons to determined precisely where the vehicle needs to be to retrieve the load from the loading station.

At act 516, vehicle 100 acquires at least one load from the loading station. A load may refer to a single box of cargo or any other suitable unit of cargo. For example, the cargo may be one or more bundles of logs. In some embodiments, vehicle 100 may acquire more than a single load. If more than one load is being acquired, the plurality of loads may be acquired from the same or different loading stations.

The at least one load may be acquired in any suitable way. For example, vehicle 100 may use load line 108 to attach to a portion of the load using a hitch device. The hitch device may be some form of hook or any other suitable mechanism for connecting to the load being acquired.

At act 518, vehicle 100 determines a destination location for the load based on load information. In some embodiments, the load information is received from the loading station via the first modulated directional signal. The load information may be encoded in the signal itself. Any suitable load information may be used. For example, an identification number, a batch number, or a type of cargo. In some embodiments the load information may comprise destination coordinates or the identity of a destination unloading station.

As previously discussed, vehicle 100 may receive updates and/or changes to the destination location at any time during the resupply method. For example, vehicle 100 may receive a communication from a management system 420 instructing vehicle 100 to change its destination location. In some embodiments, the updated destination location may also be based on the received load information. For example, if the load information is received by vehicle 100 from a loading station, that information may be communicated to the management system so that the management system may make logistical and managerial decisions based on the load each vehicle associated with the resupply system currently possesses. The management system may also take into account the needs of each base station of the resupply system.

At act 520, vehicle 100 transports the load from the loading station to the determined unloading station. Vehicle 100 may take any suitable path to the unloading station. For example, it may take the most direct path or a path that is the least dangerous to travel. In some embodiments, vehicle 100 may not travel directly to the unloading station, but may travel to an additional loading station to acquire an additional load. In some embodiments, vehicle 100 may use any number of instruments and sensors to determine the path to take to the unloading station. For example, vehicle 100 may be equipped with a GPS unit, an altimeter, video cameras, electromagnetic sensors, chemical sensors, biological sensors, and/or radar sensor. Furthermore, vehicle 100 may use information received from management system 420 to determine the path to the unloading station. Embodiments of the invention are not limited to any particular way of transporting loads.

At act 522, an unloading station sends a second modulated directional signal to vehicle 100. Any suitable signal may be used. For example, as discussed above, a modulated directional signal may be sent from the beacons of unloading station 301. The signal may comprise infrared radiation, or any other suitable type of radiation. In some embodiments, the signal may be emitted from a laser or an LED. The directional nature of the signal allows vehicle 100 to use the signal to adjust its current position so that it may accurately align the load with an unloading zone for release.

The signal may be modulated in any suitable way to transmit unloading information pertaining to the type of cargo being received at the unloading station. For example, information about the type of cargo being received by a particular unloading station may comprise information about cargo type, weight limits, dimensional limits, status of the unloading station or any other information pertaining to the unloading station that may be relevant to vehicle 100.

At act 524, vehicle 100 receives the second modulated directional signal from the unloading station. This may be done in any suitable way. In some embodiments, vehicle 100 may be equipped with at least one sensor capable of detecting the signal emitted by the loading station. For example, vehicle 100 may use one or more infrared detectors capable of detecting infrared radiation emitted by the beacons.

In response to the received second modulated directional signal, vehicle 100 may control a current position of the vehicle at act 526. The current position of a vehicle may refer to the three dimensional point in space of vehicle 100. The current position may be controlled in any suitable way. For example, vehicle 100 may be equipped with a controller configured to use the directional information received from the loading station's beacons to determined precisely where the vehicle needs to be to release the load at the unloading station.

At act 528, vehicle 100 releases at least one load at the unloading station. A load may refer to a single box of cargo or any other suitable unit of cargo. For example, if the cargo may be a bundle of logs. In some embodiments, vehicle may release more than a single load. If more than one load is being acquired, the plurality of loads may be acquired from the same or different loading stations.

The at least one load may be released in any suitable way. For example, vehicle 100 may use load line 108 to carry the load using a hitch device. The hitch device may be some form of hook or any other suitable mechanism for attaching to the load. In some embodiments, the hitch mechanism may automatically detach from the load. This detachment may be controlled by vehicle 100 or there may be a mechanism associated with the unloading station that causes the load to be released. Embodiments of the invention are not limited to any particular hitch mechanism.

In some embodiments, vehicle 100 departs its original location with the mission of acquiring at least one load from the loading station. Vehicle 100 may not initially receive any information about the load to be acquired. Instead, it is simply directed to the loading station. Upon approaching the loading station, vehicle 100 may send a request for approval to approach any particular loading station. This request for approval may be sent to management system 420 and an approval may be received from the management system 420. In some embodiments, management system 420 may have determined, in the time it took vehicle 100 to get to the loading station from its original location, that there is a higher priority load that needs transport. If there is a higher priority load in need of transport, management system 420 may redirect vehicle 100 to a different loading station to acquire and transport the higher priority load.

Embodiments of the invention described herein are not limited to any particular application. For example, the system or method may be used for resupply, transport of equipment in industry or disaster relief or any other suitable application.

Embodiments of the invention are not limited in its application to the details of construction and the arrangement of components set forth in the foregoing description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Use of the term "and/or" in the claims and the specification is intended to indicate that one or both of the cases it connects may occur. For example, "A and/or B will occur" means "A will occur, B will occur, or A and B will occur."

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A vehicle for transporting at least one load, the vehicle comprising:
   at least one sensor configured to receive a first modulated directional signal from a plurality of beacons attached to at least two guide rails of a loading station, wherein the first modulated directional signal comprises load information pertaining to the at least one load;
   at least one load line configured to carry the at least one load; and
   at least one controller configured to:
      receive at least one output from the at least one sensor, wherein the at least one output comprises the load information;
      determine a direction from which the first modulated directional signal was received based on the at least one output;
      control a current position of the vehicle based on the determined direction from which the first modulated directional signal was received, wherein the current position is controlled to move the at least one load line such that the at least two guide rails of the loading station cooperate to funnel the load line to accurately retrieve the at least one load; and
      determine a destination unloading station for the load based on the load information.

2. The vehicle of claim 1, wherein the at least one sensor is further configured to receive a second modulated directional signal from the destination unloading station, wherein the second modulated directional signal comprises unloading information pertaining to the type of cargo that may be unloaded at the destination unloading station.

3. The vehicle of claim 2, wherein the at least one output received by the controller further comprises the unloading information and wherein the controller is further configured to:
   determine a direction from which the second modulated directional signal was received based on the at least one output; and
   control a current position of the vehicle based on the determined direction from which the second modulated directional signal was received.

4. The vehicle of claim 1, wherein the vehicle is at least one of an unmanned vehicle and an autonomous vehicle.

5. The vehicle of claim 1, wherein the load information comprises information obtained using an identification number associated with an identifier of the at least one load.

6. The vehicle of claim 1, wherein the load information comprises information describing the contents of the at least one load.

7. The vehicle of claim 1, wherein the load information is selected from the group consisting of a quantity, a weight, a set of dimensions, a geometrical description, a batch number, a content description, a destination location and an identification number.

8. A base station comprising:
   a cargo zone for at least one load;
   at least two guide rails for funneling a load line to the cargo zone to accurately retrieve or deliver the at least one load, wherein the load line is attached to a vehicle and is configured to carry the at least one load; and
   a plurality of beacons attached to the at least two guide rails, each of the plurality of beacons attached to one of the at least two guide rails and configured to send at least one directional signal to the vehicle, wherein each of the plurality of beacons modulates the at least one directional signal to encode information.

9. The base station of claim 8, further comprising:
   an automatic feed configured to direct the at least one load towards or away from the cargo zone.

10. The base station of claim 9, further comprising:
    a scanner configured to scan an identifier of the at least one load to obtain an identification number of the at least one load.

11. The base station of claim 10, further comprising:
    a controller configured to obtain load information pertaining to the at least one load based on the identification number of the at least one load.

12. The base station of claim 11, wherein:
    the base station is a loading station;
    the cargo zone is a loading zone;
    the automatic feed is configured to direct the at least one load towards the loading zone;
    the controller is configured to transmit at least one of the load information and the identification number to the plurality of beacons; and
    each of the plurality of beacons modulates the at least one directional signal to encode at least one of the identification number and the load information.

13. The base station of claim 12, wherein the load information is selected from the group consisting of a quantity, a weight, a set of dimensions, a geometrical description, a batch number, a content description, a destination location and an identification number.

14. The base station of claim 11, wherein:
    the base station is an unloading station;
    the cargo zone is an unloading zone;
    the automatic feed is configured to direct the at least one load away from the unloading zone;
    the controller is configured to transmit unloading information pertaining to the unloading station to the plurality of beacons; and
    each of the plurality of beacons modulates the at least one directional signal to encode the unloading information.

15. The base station of claim 14, wherein the unloading information is selected from the group consisting of a type of load that may be received by the unloading station, a status of the unloading station, a maximum weight that may be received by the unloading station, and maximum dimensions of a load that may be received by the unloading station.

16. The base station of claim 10, wherein the identifier is a radio frequency identification tag.

17. A method of automatically transporting at least one load using a vehicle, the method comprising:
    sending, from a first plurality of beacons attached to a first pair of guide rails at a loading station, a first modulated directional signal to the vehicle, wherein the first modulated directional signal comprises load information pertaining to the at least one load;
    receiving, at the vehicle, the first modulated directional signal;
    controlling a current position of the vehicle based on the first modulated directional signal received from each of the first plurality of beacons, wherein the current position is controlled to move at least one load line of the vehicle such that the first pair of guide rails of the loading station cooperate to funnel the load line to accurately retrieve the at least one load from the loading station;
    determining a destination location for the at least one load based on the load information;

transporting, by the vehicle, the at least one load from the loading station to an unloading station located at the destination location;

sending, from a second plurality of beacons attached to a second pair of guide rails at an unloading station, a second modulated directional signal to the vehicle, wherein the second modulated directional signal comprises information pertaining to the unloading station; and controlling the current position of the vehicle based on the second modulated directional signal received from each of the second plurality of beacons, wherein the current position is controlled to move the at least one load line such that the second pair of guide rails cooperate to funnel the load line to accurately deliver the at least one load to the unloading station.

18. The method of claim 17, further comprising:

scanning an identifier of the at least one load to ascertain an identification number of the at least one load; and determining the load information from the identification number.

19. The method of claim 18, wherein:

the load information comprises the identification number of the at least one load; and determining the destination location is achieved by communicating the identification number to a management system and receiving the destination location from the management system.

\* \* \* \* \*